United States Patent [19]

Kimura et al.

[11] 4,351,657
[45] Sep. 28, 1982

[54] METHOD FOR COATING OPTICAL FIBERS WITH THERMOPLASTIC RESIN

[75] Inventors: Takao Kimura; Shigeki Sakaguchi; Hisao Takata, all of Mito, Japan

[73] Assignee: Nippon Telegraph & Telephone Public Corporation, Tokyo, Japan

[21] Appl. No.: 233,476

[22] Filed: Feb. 11, 1981

[30] Foreign Application Priority Data

Feb. 21, 1980 [JP] Japan ................................ 55-19843

[51] Int. Cl.³ ...................... C03B 37/025; C03C 25/02
[52] U.S. Cl. ...................................... 65/3.11; 65/3.41; 65/3.44; 65/13; 427/163
[58] Field of Search ...................... 65/3.11, 3.12, 3.13, 65/3.41, 3.43, 13, 3.44; 427/163

[56] References Cited

U.S. PATENT DOCUMENTS

| | | | |
|---|---|---|---|
| 3,227,032 | 1/1966 | Upton | 65/3.11 X |
| 4,115,087 | 9/1978 | Martin | 65/3.43 |
| 4,118,212 | 10/1978 | Aulich et al. | 65/13 X |
| 4,208,200 | 6/1980 | Claypoole et al. | 65/3.41 |
| 4,289,516 | 9/1981 | Krohn | 65/13 X |

FOREIGN PATENT DOCUMENTS

| | | | |
|---|---|---|---|
| 2414009 | 10/1974 | Fed. Rep. of Germany | 65/3.44 |
| 7804448 | 10/1978 | Netherlands | 65/3.41 |

*Primary Examiner*—Richard V. Fisher
*Attorney, Agent, or Firm*—Frishauf, Holtz, Goodman & Woodward

[57] ABSTRACT

In a process for preparing optical fibers, an optical fiber preform is heated and softened to be drawn at a high speed into an optical fiber. The optical fiber is passed through a plastic pipe of a thermoplastic resin. As the optical fiber is passed through the plastic pipe, the lower part of the plastic pipe is gradually inserted into a heating unit to be uniformly heated. The heated plastic pipe is softened and is coated over the optical fiber.

19 Claims, 8 Drawing Figures

F I G. 6
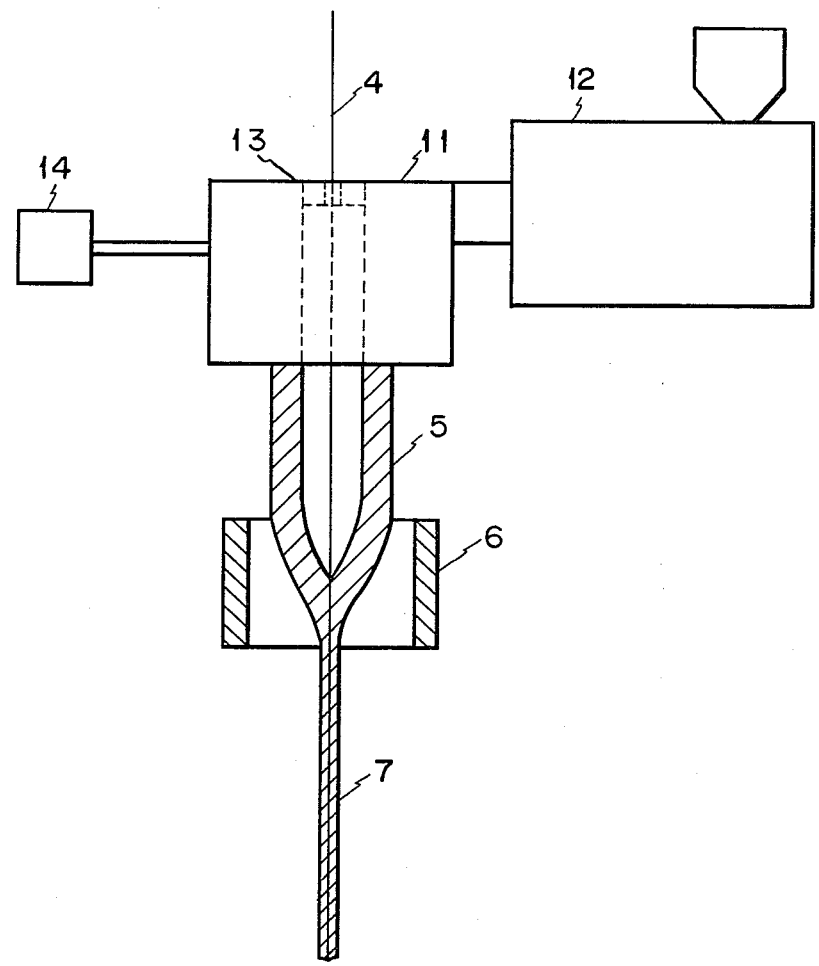

METHOD FOR COATING OPTICAL FIBERS WITH THERMOPLASTIC RESIN

The present invention relates to an improved coating method for preparing optical fibers.

The coating methods involved in the manufacture of optical fibers are roughly divided into the dip method and the hot melt method. According to the dip method, a coating material which is in liquid form at room temperature, for example, silicone RTV, urethane resin, epoxyacrylate or the like is applied to the optical fiber, and it is cured by heat, light or the like and dried thereafter. According to the hot melt method, a coating material which is in solid form at room temperature, for example, an ethylene-vinyl acetate copolymer (EVA) is heated into a liquid. After this material is applied to the optical fiber, it is cooled.

In these conventional coating methods for optical fibers, it is known that uniform application of the coating material on an optical fiber which is drawn at a high speed is difficult for the reasons to be described below.

As described in "The Cooling Rate of Glass Fibres", Glass Technology 12, No. 5, 127 (1978), the temperature of the drawn optical fiber is elevated as the drawing speed becomes greater so that the application of the coating material to the optical fiber becomes difficult. Since a longer drying furnace or a longer cooling tank is required for solidifying the applied coating material as the drawing speed becomes greater, the drawing instrument itself becomes large in size. Furthermore, when a thermoset resin is used, degradation of the coating material such as gelation occurs in the applicator as the temperature of the optical fiber is elevated.

Accordingly, the drawing speed presently adopted is 20 to 30 m/min as described in "Organic Polymeric Coatings for Silica Fibers", J. Appl. Polym. Sci., 23, 75 (1979) and "Tensile Strength of Polymer Coated Optical Fibers", ACS/CSJ Chemical Congress '79 Division of Organic Coatings and Plastics Chemistry p 217 (1979). When the drawing speed exceeds 70 m/min, coating thickness fluctuations ($\mu$m) are caused, as shown in FIG. 1, resulting in an increase in nonuniformity of the coating thickness. Referring to FIG. 1, the solid circle marks ● and the hollow circle marks ○ correspond to the cases wherein silicones of 3,000 cp viscosity and 1,200 cp viscosity, respectively, are used. When such nonuniformity in the primary coating increases, the nonuniformity of the secondary coating increases even more. This nonuniformity of the secondary coating which causes an increase in transmission loss due to microbending also causes fracture or failure of the fiber. From the perspective of easy handling and strength, a method is known for splicing a fiber with another fiber without stripping the primary coating. However, with the eccentricity in the coating, the centers of the fibers may not be aligned, resulting in splicing loss.

It has been confirmed by experiments conducted by the present inventors that an increase in the drawing speed (m/min) results in an abrupt reduction in the tensile strength (kg/mm$^2$). The tensile strength of 20 optical fiber samples was measured with ratings of 1 m gauge length and 0.05 min$^{-1}$ strain rate. The results are shown in FIG. 2. Referring to this figure, the square marks □ correspond to the cases in which conventional coating materials are used, thermoset silicone resins. It is seen that the tensile strength (kg/mm$^2$) is reduced when the drawing speed exceeds 70 m/min.

Although a higher drawing speed has been desired in the manufacture of optical fibers from the perspective of economy and mass-production, this has not been realized.

The present invention has been made in consideration of this and has for its object to provide a process for preparing optical fibers which realizes a higher drawing speed.

In order to accomplish the above and other objects, the present invention provides a method for preparing optical fibers comprising the steps of drawing at or above a predetermined speed an optical fiber preform which has been heated to be softened; and passing said drawn optical fiber through a plastic pipe of a thermoplastic resin, while heating and softening part of said plastic pipe to coat it to said optical fiber as said optical fiber is being drawn.

Since the above steps are adopted in the process for preparing optical fibers of the present invention, the process does not require a liquefied coating material, so that the application step may be eliminated and neither a drying furnace nor a cooling tank for solidifying the coating material is required. The temperature of the coating material for coating the optical fiber drawn through a heated and softened plastic pipe is relatively low, and only a short period of time is required to solidify the coating material. Since a thermoplastic resin is used for the plastic pipe, gelation does not occur during coating even when the temperature of the plastic fiber is elevated as the drawing speed becomes greater. The inner wall of the plastic pipe which is brought into contact with the optical fiber is melted to improve the interface between the optical fiber and the coating material. Due to this, the uniformity of the coating thickness is maintained, transmission losses do not increase, and an abrupt reduction in the tensile strength (kg/mm$^2$) is prevented. Furthermore, since there is no eccentricity in the coating, the optical fibers may be spliced without any misalignment, holding down splicing losses. Modified silicone which is conventionally used for the coating material is expensive and may not be mass-produced. In contrast to this, the coating material of the present invention may be a general thermoplastic resin so that it may be mass-produced at lower cost.

This invention can be more fully understood from the following detailed description when taken in conjunction with the accompanying drawings, in which:

FIG. 6 is a schematic view of the structure of still another device used for performing the process for preparing optical fibers according to the present invention;

Figure 3:
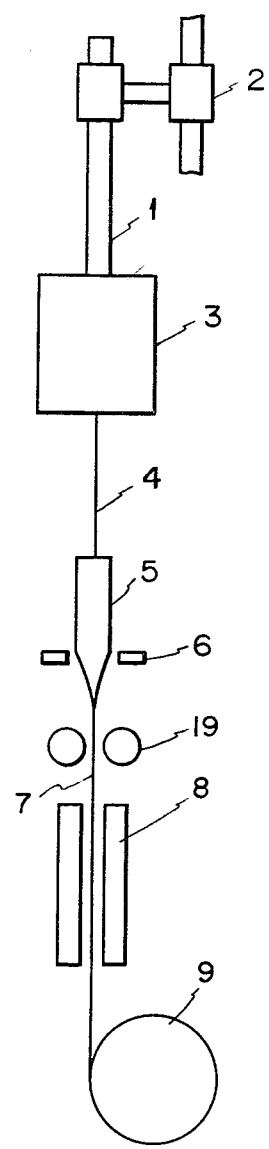
FIG. 3 is a schematic view of a device used for performing the process for preparing optical fibers according to the present invention.

Embodiments of the present invention will now be described with reference to the accompanying drawings. As shown in FIG. 3, optical fiber preform 1 is gradually inserted in a drawing furnace 3 by a feeder 2. The preform 1 is heated to about 2,000° C. in the drawing furnace 3 to be softened and is drawn to form an optical fiber 4. The drawn optical fiber 4 is passed at a predetermined speed through a plastic pipe 5 of a thermoplastic. The lower part of the plastic pipe 5 is heated by being gradually inserted in a cylindrical heating unit e.g., a heater 6. The plastic pipe 5 may be inserted into the heating unit at a speed corresponding to the drawing speed of the optical fiber 4. The lower part of the plastic pipe 5 is softened at the end by being heated and thus coats the optical fiber 4. The coated optical fiber 7 is pressed between rollers 19 and is then cooled while passing through cooling tank 8, and is wound up by a hoisting unit, e.g., a drum 9. The cooling tank 8 may be eliminated as required. The primary coating of the optical fiber is performed in this manner. In general, one pipe can coat a fiber about 10 km long, although the actual length varies depending upon the length and the thickness of the plastic pipe 5. The material of the plastic pipe 5 may include thermoplastic elastomers such as styrene-butadiene copolymer, urethane-ester copolymer, ester-ether copolymer, propylene-EPDM copolymer, and ethylene-vinyl acetate copolymer; polyolefin type plastics such as polyethylene, chlorinated polyethylene, polypropylene, ethylene-propylene copolymer; polyfluorocarbons such as polyvinylidene fluoride, polytetrafluoroethylene, and tetrafluoroethylene-hexafluoropropylene copolymer; polymethylmethacrylate; polymethylacrylate; polyamides; polycarbonates; polyacetals; polystyrene; polyesters; polysulfones; polyethers; polyesterimides; ABS resin; and so on.

In order to improve the reliability of the strength of the optical fiber, it is possible, before coating by softening the plastic pipe 5, to perform a surface treatment of the optical fiber with a silane coupling agent such as methyltrichlorosilane, dimethyldichlorosilane, trimethylchlorosilane, vinyltriethoxysilane, $\gamma$-aminopropyltrimethoxysilane, and $\gamma$-methacryloxypropyltrimethoxysilane. Instead of performing such a surface treatment, it is also effective to use a plastic pipe containing such a silane coupling agent to improve the reliability.

Figure 4:
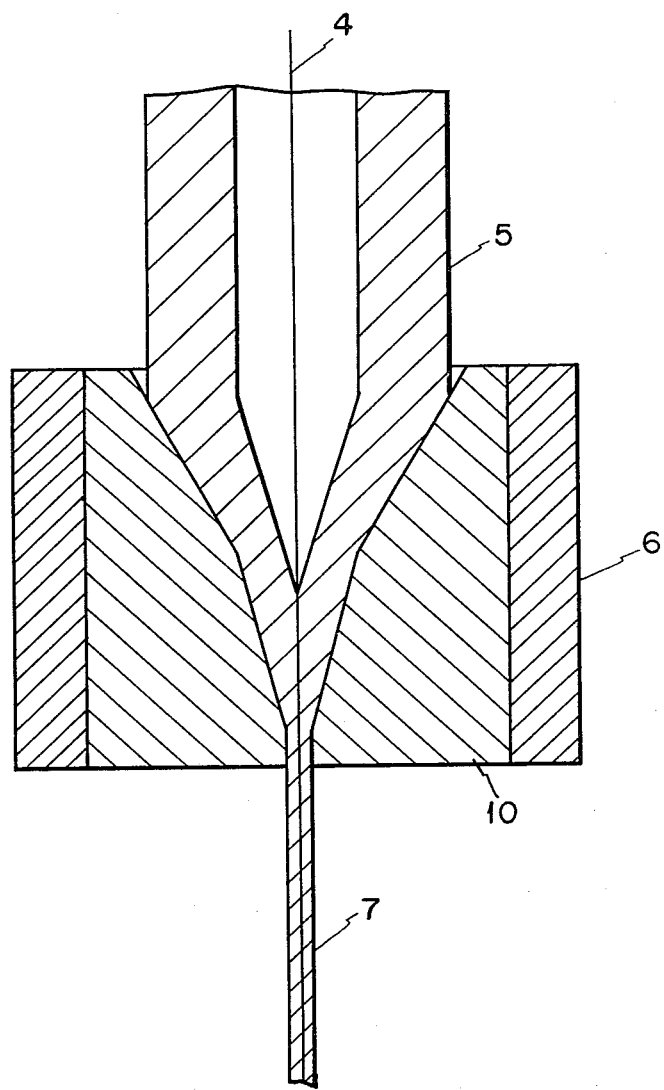
FIG. 4 is a schematic view of the main part of another device used for performing the process for preparing optical fibers according to the present invention.

FIG. 4 shows an embodiment according to which, in the device shown in FIG. 3, a forming die 10 is incorporated within the heater 6 in order to coat the resin to a uniform outer diameter on the elongate optical fiber 4 when heating and softening the lower part of the plastic pipe 5. The outer diameter of the coated optical fiber 4 is regulated by passage through the forming die 10. When an optical fiber of 125 $\mu$m diameter was drawn at a speed of 250 m/min using Teflon as the coating material, the fluctuations in the outer diameter for a coated outer diameter of 400 $\mu$m were limited to 5 $\mu$m. The thickness of the coating is determined by the thickness and the feeding speed of the plastic pipe 5 and the drawing speed of the optical fiber. When the thickness of the plastic pipe 5 and the drawing speed are constant, the thickness of the coating is controlled by adjusting the feeding speed of the plastic pipe 5 into the heater 6.

FIG. 6 shows an extruder for extruding the plastic pipe 5 under the condition that the optical fiber 4 is drawn at a high speed. The thermoplastic resin is heated and melted by an extruder 12 and formed into the plastic pipe 5 by a cross head 11. The plastic pipe 5 is reheated by the heater 6 and coated over the optical fiber 4 to provide the coated optical fiber 7. Since the inner diameter of the plastic pipe 5 is sufficiently greater than the outer diameter of the optical fiber 4, it is larger than the mouth diameter of the metal core within the cross head 11. Accordingly, since it is not brought into mechanical contact with the optical fiber 4, the optical fiber 4 is not damaged. In this case, the outer diameter of the coating is controlled by the thickness of the pipe, the feeding speed of the pipe, the fiber diameter or the drawing speed of the optical fiber, the heating temperature of the heater and the like. With the Teflon coated optical fiber 7 prepared by this device, the drawing speed of the optical fiber 7 could be raised to 300 m/min to provide a product in which the outer diameter of the optical fiber 4 was 125 $\mu$m and the outer diameter of the coated optical fiber 7 was 400 $\mu$m. Fluctuations in the outer diameter of the coated optical fiber were limited to 10 $\mu$m by controlling the amount of extrusion.

Figure 5:
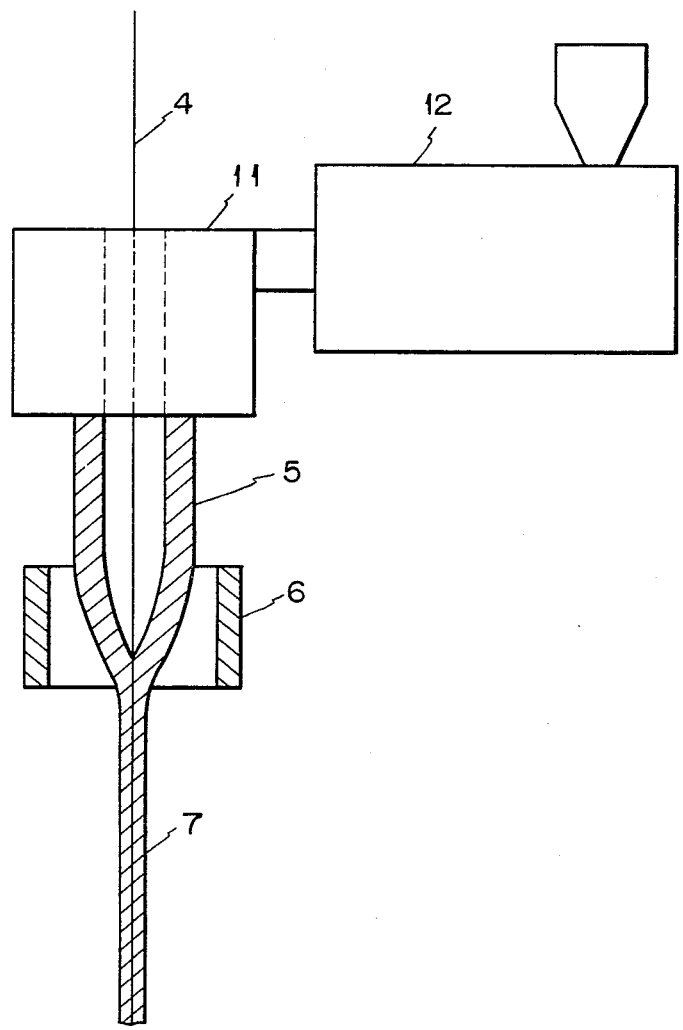
FIG. 5 is a schematic view of the structure of still another device and used for performing the process for preparing optical fibers according to the present invention.

FIG. 6 shows a device which is basically the same as the device of the embodiment shown in FIG. 5, wherein a guide 13 having a slightly larger outer diameter than the outer diameter of the optical fiber 4 is incorporated in the cross head 11, and the guide 13 and the plastic pipe 5 can be evacuated by a vacuum pump 14 to place the interior of the thermoplastic pipe under reduced pressure. When the plastic pipe 5 is reheated and melted by the heater 6 while the vacuum pump 14 is in operation, the adhesion with the optical fiber 4 is improved.

Figure 7:
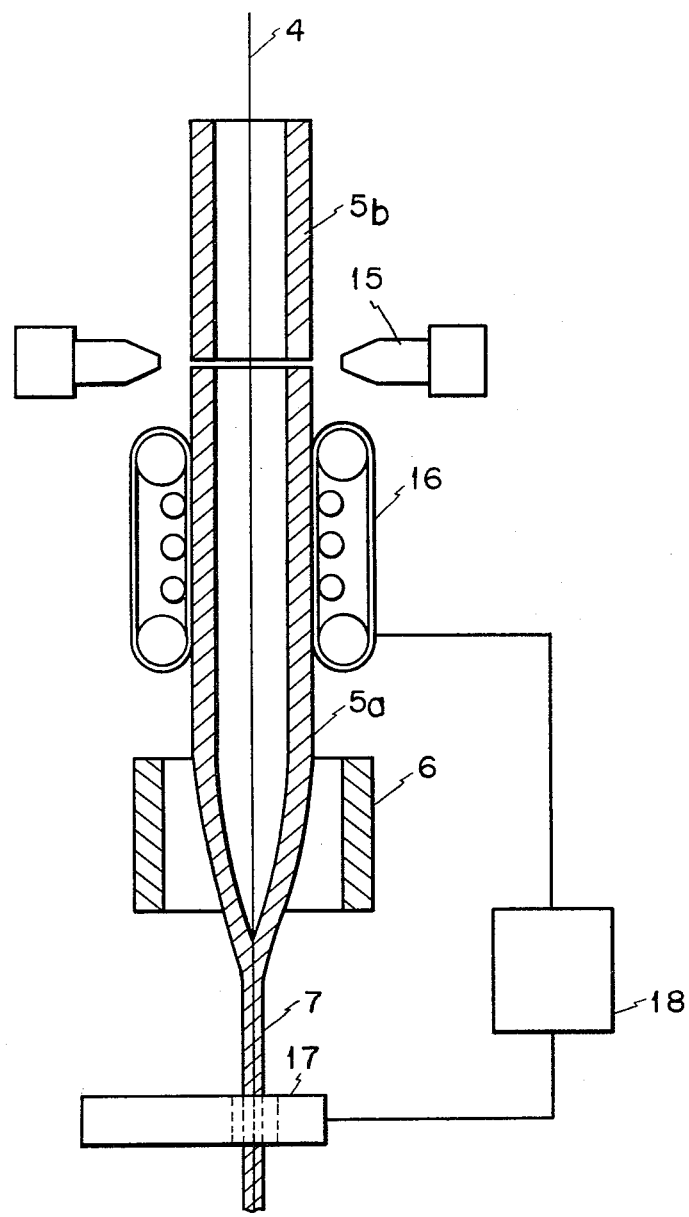
FIG. 7 is a schematic view of the structure of still another device used for performing the process for preparing optical fibers according to the present invention.

FIG. 7 shows another embodiment of the device according to which an elongate plastic pipe is not extruded, but plastic pipes of specific lengths are sequentially coupled together to provide an elongate pipe.

The front end of a plastic pipe 5b of a certain length is aligned with a sequentially fed plastic pipe 5a, through both of which the optical fiber 4 passed. The aligned ends are connected by heated air blown from, for example, a hot jet torch 15.

The connected plastic pipes are sequentially fed by a feeder 16 to the interior of the heater 6, heated and melted there, and coated over the optical fiber 4 to provide the primary coated optical fiber 7. The feeding speed of the feeder 16 may be controlled by a feedback circuit 18 interposed between a fiber diameter detector 17 and the feeder 16 in such a manner that the outer diameter of the coated optical fiber 7 is kept constant.

Particular examples will now be described in order to show that the eccentricity ($\mu$m), the mean tensile strength (kg/mm$^2$), and the transmission losses (dB/km) of the coated optical fiber prepared at a drawing speed of 60 m/min or more are improved over those of a coated optical fiber prepared by the conventional process at a drawing speed of 40 m/min, despite the fact that the drawing speed was increased.

As an example of the conventional process, a VAD optical fiber preform was heated and softened at 2,000°

C. and drawn at a speed of 40 m/min. After applying silicone RTV rubber, the optical fiber was passed through a heater heated to about 400° C. for curing. The coating thickness of the optical fiber thus obtained was about 120 μm, and the eccentricity of the coating, that is, the difference between the maximum thickness and the minimum thickness, was about 94 μm as shown by the solid circle marks ● in FIG. 8. The mean tensile strength (kg/mm$^2$) maintained a value of 520 kg/mm$^2$ at the speed of 40 m/min as seen from FIG. 2. The transmission loss (dB/km) was 3.01 dB/km with a 0.85 μm wavelength and was 1.35 (dB/km) with a 1.55 μm wavelength.

The process of the present invention will now be described with reference to cases wherein the drawing speed was 60 m/min, 120 m/min, and 180 m/min, respectively.

Figure 8:
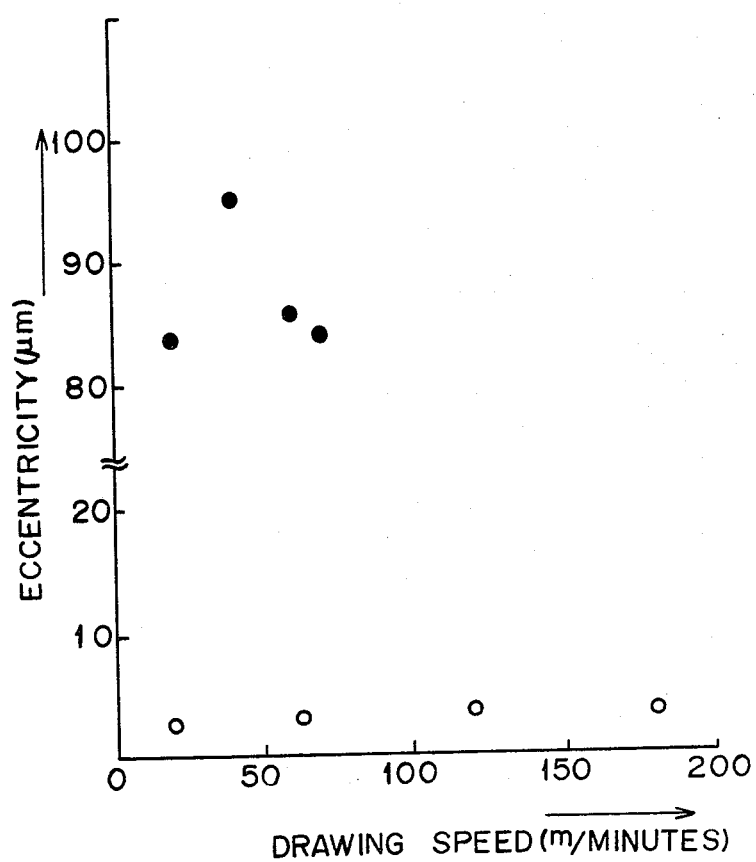
FIG. 8 is a graph showing the relation between the drawing speed (m/min) and the eccentricity ($\mu$m) according to the conventional process for preparing optical fibers and according to the process of the present invention.

First, the optical fiber preform obtained by the VAD method was heated and softened at about 2,000° C., and was drawn at a speed of 60 m/min to provide an optical fiber of 125 μm outer diameter. The drawn optical fiber was passed inside a plastic pipe of polypropylene having a 30 mm outer diameter and a 12 mm inner diameter. The plastic pipe was softened by gradually being inserted inside a cylindrical heater heated to about 275° C., and the material of the plastic pipe was coated over the optical fiber. The coated optical fiber was cooled by air and thereafter wound. The coated optical fiber thus obtained was 120 μm in coating thickness and the eccentricity of the coating was 2.6 μm as shown in FIG. 8. The mean tensile strength was 522 kg/mm$^2$ as shown by the solid circle marks ● in FIG. 2. The transmission loss was 4.50 dB/km with a 0.85 μm wavelength, and was 3.85 dB/km with a 1.55 μm wavelength.

Description will be made of a second case wherein the optical fiber preform was softened by heating at about 2,000° C. and was drawn at a speed of 120 m/min to provide an optical fiber of 125 μm outer diameter. The drawn optical fiber was passed inside a plastic pipe of tetrafluoroethylene-hexafluoropropylene copolymer having a 30 mm outer diameter and 12 mm inner diameter. Under this condition, the plastic pipe was softened by gradually being inserted into a cylindrical heater heated to about 475° C., and the material of the plastic pipe was coated over the optical fiber. The coated optical fiber was cooled by air and was then wound. The coated optical fiber obtained in this manner was 120 μm in coating thickness and the eccentricity of the coating was 3.5 μm. The mean tensile strength was 522 kg/mm$^2$ as seen from FIG. 2. The transmission loss was 3.25 dB/km with a 0.85 μm wavelength and was 1.45 dB/km with a 1.55 μm wavelength.

Figure 1:
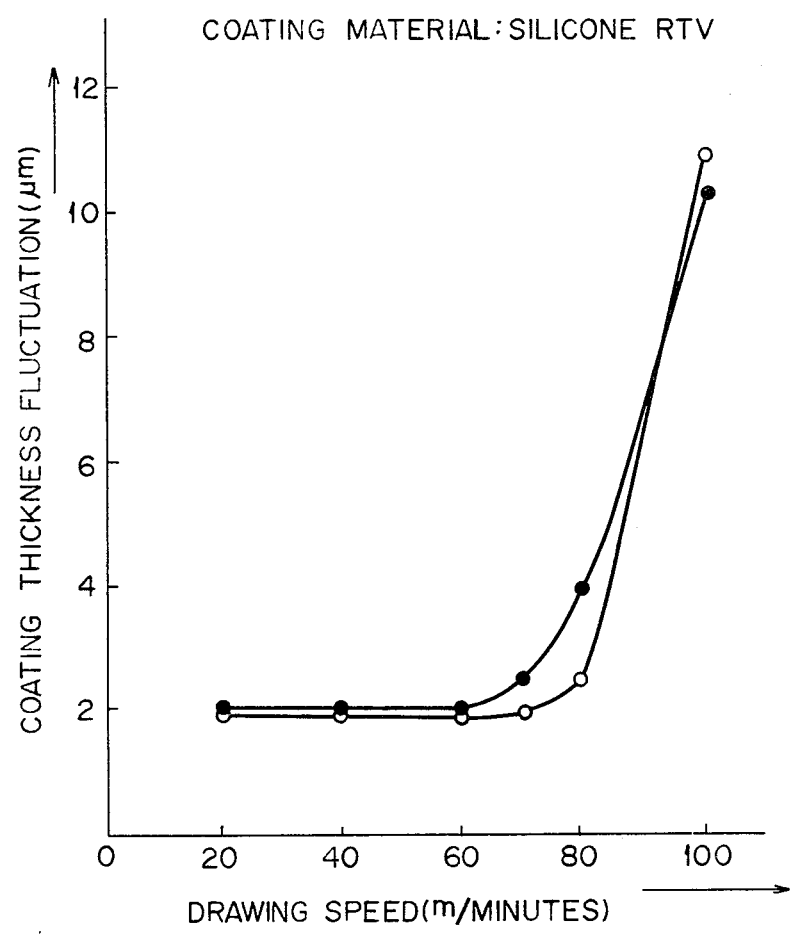
FIG. 1 is a graph showing the relation between the drawing speed (m/min) and the coating thickness fluctuation ($\mu$m) according to the conventional process for preparing optical fibers.
Figure 2:
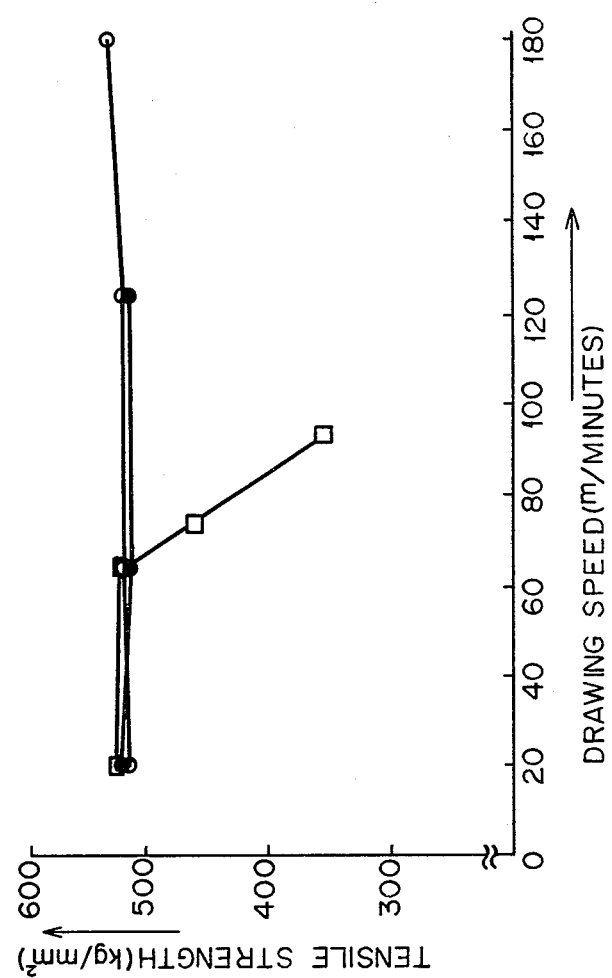
FIG. 2 is a graph showing the relation between the drawing speed (m/min) and the tensile strength (kg/mm$^2$) comparing the conventional process for preparing optical fibers with the process for preparing the optical fibers of the present invention.

A third case will now be described wherein the optical fiber preform was softened by heating at 2,050° C. and was drawn at a speed of 180 m/min to provide an optical fiber of 125 μm outer diameter. The drawn optical fiber was passed inside a plastic pipe of urethane-ester copolymer having a 12 mm outer diameter and a 10 mm inner diameter. Under this condition, the plastic pipe was softened by being gradually inserted into a cylindrical heater heated to about 330° C., and the material of the plastic pipe was coated over the optical fiber. The coated optical fiber was cooled by air and was thereafter wound. The coated optical fiber thus obtained was 12 μm in coating thickness and the eccentricity of the coating was 3.8 μm as shown in FIG. 8. The mean tensile strength was 532 kg/mm$^2$ as shown in FIG. 2. The transmission loss was 3.03 dB/km with a 0.85 μm wavelength and was 1.32 dB/km with a 1.55 μm wavelength.

The solid circle marks ● in FIG. 2 show the tensile strength (kg/mm$^2$) as a function of the drawing speed (m/min) when the resin was polypropylene, and the hollow circle marks ○ show the same when the plastic was urethane-ester copolymer.

When comparisons are made between the coated optical fibers prepared by the first, second and third examples of the process of the present invention and the coated optical fibers prepared by coating a silicone resin on the optical fibers according to the conventional process, the tensile strength (kg/mm$^2$) abruptly decreased with the coated optical fiber of the conventional process as may be apparent from FIG. 2 when the drawing speed exceeded 60 m/min. In contrast to this, with the coated optical fibers of the present invention, the tensile strength (kg/mm$^2$) did not change substantially, but remained on the order of 500 kg/mm$^2$ even when the drawing speed was raised to 180 m/min. As for the relation between the drawing speed (m/min) and the eccentricity (μm) of the coating, with the coated optical fibers of the conventional process, the eccentricity was as great as 80 μm or more when the drawing speed was in the vicinity of 50 m/min, and reached 94 μm when the drawing speed was 40 m/min, as shown in FIG. 8. On the contrary, with the coated optical fibers of the present invention, the eccentricity was significantly improved and was in the vicinity of 3 μm even when the drawing speed exceeded 40 m/min and 60 m/min, respectively.

As for the transmission loss, that of the coated optical fibers of the conventional process obtained at a drawing speed of 40 m/min was comparable to that of the coated optical fibers of the process according to the present invention at a high drawing speed of 60 m/min or more.

Among the first, second and third examples described above, the process with a drawing speed of 120 m/min is considered to be the best mode of carrying out the present invention.

Although the description was made with reference to the examples wherein the drawing speeds were 60 m/min, 120 m/min, and 180 m/min, respectively, it is also possible to adopt a drawing speed of over 180 m/min by suitably selecting the coating material, the shape of the plastic pipe, the heating temperature of the plastic pipe and so on.

Although the above description was made with reference to the case of a primary coating for coating the optical fiber immediately after drawing, the process of the present invention is similarly applicable to a secondary coating according to which a further coating is applied over optical fibers having a primary coating. Furthermore, the primary coating and the secondary coating may be simultaneously performed by using a multi-layered pipe and selecting the softening temperature of the primary coating material to be substantially equal to or lower than the softening temperature of the secondary coating material.

It is to be understood that the process for preparing optical fibers of the present invention is not limited to the particular examples described above, and various other modifications may be made within the spirit and scope of the present invention.

What we claim is:

1. A process for preparing optical fibers comprising:

drawing an optical fiber preform, which has been heated and softened, at or above a predetermined speed to form an optical fiber;

continuously extruding thermoplastic resin around said optical fiber to form a continuous thermoplastic pipe having an inner diameter sufficiently large to surround said optical fiber and continuously feeding said extruded thermoplastic pipe along with said optical fiber; and passing said continuously fed optical fiber and surrounding thermoplastic pipe to a means for heating and softening part of said surrounding thermoplastic pipe to cause said heated and softened thermoplastic pipe to coat said optical fiber as said optical fiber is being fed together with said thermoplastic pipe.

2. The process of claim 1, wherein said predetermined speed at which said optical fiber is drawn is at least 60 meters per minute.

3. The process of claim 1, wherein said continuously fed optical fiber and surrounding thermoplastic pipe which is being fed to said means for heating is fed at a speed corresponding to the speed at which said optical fiber is drawn.

4. The process of claim 1 or 3, wherein the surface of said optical fiber is treated with a silane coupling agent before it is coated with said heated and softened thermoplastic pipe.

5. The process of claim 1 or 2, wherein the pressure in the interior of said thermoplastic pipe is reduced when it is heated and softened to coat said optical fiber.

6. The process of claim 4, wherein the pressure in the interior of said thermoplastic pipe is reduced when it is heated and softened to coat said optical fiber.

7. The process of claim 1 or 2, wherein said thermoplastic resin is selected from the group consisting of styrene-butadiene copolymers, urethane-ester copolymers, ester-ether copolymers, propylene-EPDM copolymers, ethylene-vinyl acetate copolymers, polyethylene, chlorinated polyethylene, polypropylene, ethylene-propylene copolymers, polyvinylidene fluoride, polytetrafluoroethylene, tetrafluoroethylene-hexafluoropropylene copolymer, polymethylmethacrylate, polymethylacrylate, polyamides, polycarbonates, polyacetals, polystyrene, polyesters, polysulfones, polyethers, polyesterimides, and ABS resin.

8. The process of claim 4, wherein said thermoplastic resin is selected from the group consisting of polypropylene, tetrafluoroethylene-hexafluoropropylene copolymer, and urethane-ester copolymers.

9. The process of claim 6, wherein said thermoplastic resin is selected from the group consisting of polypropylene, tetrafluoroethylene-hexafluoropropylene copolymer, and urethane-ester copolymers.

10. The process of claim 1 or 3, wherein said optical fiber and said thermoplastic pipe are being drawn at a speed of at least 120 meters per minute.

11. The process of claim 4, wherein said optical fiber is drawn at a speed of at least 120 meters per minute.

12. The process of claim 7, wherein said optical fiber is drawn at a speed of at least 120 meters per minute.

13. The process of claim 8, wherein said optical fiber is drawn at a speed of at least 120 meters per minute.

14. The process of claim 9, wherein said optical fiber is drawn at a speed of at least 120 meters per minute.

15. The process of claim 1 or 3, wherein said optical fiber and surrounding heated and softened thermoplastic pipe are passed through a forming die to reduce the diameter of said thermoplastic pipe and to coat said optical fiber with said thermoplastic pipe and to regulate the outer diameter of the thermoplastic coated optical fiber.

16. The process of claim 7, wherein said optical fiber and surrounding heated and softened thermoplastic pipe are passed through a forming die to reduce the diameter of said thermoplastic pipe and to coat said optical fiber with said thermoplastic pipe and to regulate the outer diameter of the thermoplastic coated optical fiber.

17. The process of claim 10, wherein said optical fiber and surrounding heated and softened thermoplastic pipe are passed through a forming die to reduce the diameter of said thermoplastic pipe and to coat said optical fiber with said thermoplastic pipe and to regulate the outer diameter of the thermoplastic coated optical fiber.

18. The process of claim 11, wherein said optical fiber and surrounding heated and softened thermoplastic pipe are passed through a forming die to reduce the diameter of said thermoplastic pipe and to coat said optical fiber with said thermoplastic pipe and to regulate the outer diameter of the thermoplastic coated optical fiber.

19. The process of claim 14, wherein said optical fiber and surrounding heated and softened thermoplastic pipe are passed through a forming die to reduce the diameter of said thermoplastic pipe and to coat said optical fiber with said thermoplastic pipe and to regulate the outer diameter of the thermoplastic coated optical fiber.

* * * * *